(12) United States Patent
Wiggins, Sr.

(10) Patent No.: US 9,180,641 B1
(45) Date of Patent: Nov. 10, 2015

(54) METHOD AND APPARATUS FOR COMPACTING POWDERS

(71) Applicant: William H. Wiggins, Sr., Sandersville, GA (US)

(72) Inventor: William H. Wiggins, Sr., Sandersville, GA (US)

(*) Notice: Subject to any disclaimer, the term of this patent is extended or adjusted under 35 U.S.C. 154(b) by 0 days.

(21) Appl. No.: 14/804,028

(22) Filed: Jul. 20, 2015

Related U.S. Application Data

(62) Division of application No. 14/513,551, filed on Oct. 14, 2014, now Pat. No. 9,102,115.

(60) Provisional application No. 61/891,610, filed on Oct. 16, 2013.

(51) Int. Cl.
| | |
|---|---|
| *B29B 13/00* | (2006.01) |
| *B65B 1/24* | (2006.01) |
| *B30B 7/02* | (2006.01) |
| *B30B 15/06* | (2006.01) |
| *B30B 15/30* | (2006.01) |
| *B30B 15/32* | (2006.01) |

(52) U.S. Cl.
CPC .................. *B30B 7/023* (2013.01); *B30B 15/06* (2013.01); *B30B 15/302* (2013.01); *B30B 15/32* (2013.01)

(58) Field of Classification Search
None
See application file for complete search history.

(56) References Cited

U.S. PATENT DOCUMENTS

| | | | |
|---|---|---|---|
| 2,806,771 | A | 9/1957 | Cuthbertson et al. |
| 5,672,313 | A | 9/1997 | Shiga et al. |
| 6,238,473 | B1 | 5/2001 | Maxwell et al. |
| 6,761,763 | B2 | 7/2004 | Wiggins, Sr. et al. |
| 8,382,859 | B2 | 2/2013 | Wiggins, Sr. |
| 8,641,980 | B2 | 2/2014 | Wiggins, Sr. |
| 2003/0082258 | A1 | 5/2003 | Henderson |
| 2010/0209876 | A1 | 8/2010 | Wagner et al. |

FOREIGN PATENT DOCUMENTS

WO  WO2012/143960  10/2012

*Primary Examiner* — Mary F Theisen
(74) *Attorney, Agent, or Firm* — Lee & Hayes, PLLC; Charles Warner

(57) ABSTRACT

An apparatus for compacting a powder includes a feed section (20), a compaction section (21), a discharge section (22), and a conveyor belt (103) extending through the feed, compaction, and discharge sections to convey powder through those sections. The feed section receives an incoming powder onto the conveyor belt. The compaction section compresses the incoming powder on the conveyor belt between two plates (8, 9) to provide a compacted powder. The top plate (8) may be pressed downward toward the bottom plate (9), the bottom plate may be pressed upward toward the top plate, or both. The discharge section receives the compacted powder from the compaction section on the conveyor belt. End plates (16) and side plates (11) confine the incoming powder during compaction.

20 Claims, 9 Drawing Sheets

(SECTION A-A)

(SECTION A–A)

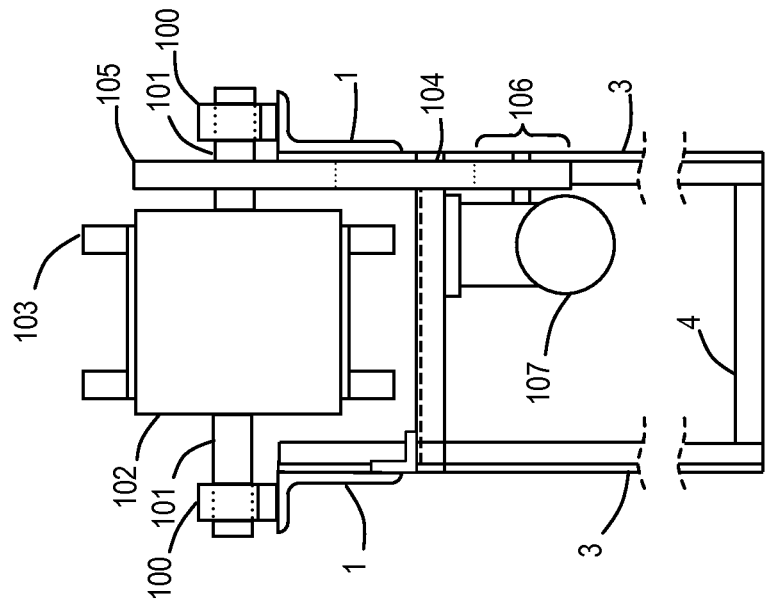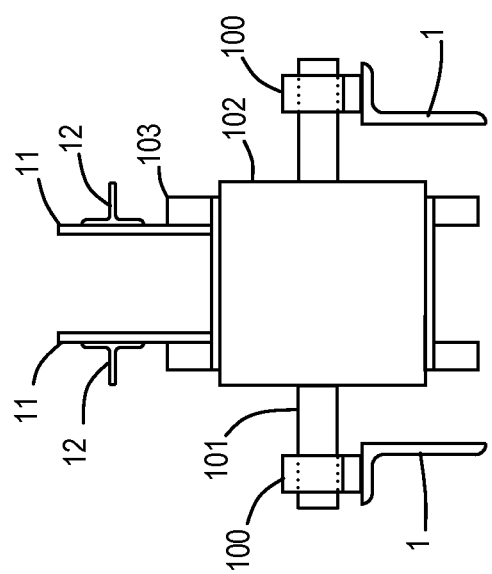

(SECTION D – D)

(SECTION D – D)

(SECTION E – E)

METHOD AND APPARATUS FOR COMPACTING POWDERS

CROSS-REFERENCE TO RELATED APPLICATION

This application is a divisional of U.S. patent application Ser. No. 14/513,551 filed Oct. 14, 2014, titled "Method and Apparatus For Compacting Powders,"now U.S. Pat. No. 9,102,115, which claims the priority of U.S. Provisional Patent Application No. 61/891,610 filed Oct. 16, 2013, titled "Method And Apparatus For Compacting Powders", the entire disclosure and contents of both of which are hereby incorporated by reference herein.

BACKGROUND

A "powder", as used herein, is a fluffy material which is composed of fine, loose particles. "Unit weight" is weight per volume and is generally expressed as pounds per cubic foot or grams per cubic centimeter. The unit weight will vary according to the specific material. For example, non-compacted calcined kaolin may have a unit weight of 10 to 15 pounds per cubic foot; while non-compacted air floated kaolin may have a unit weight of 18 to 30 pounds per cubic foot.

Fluffy, low unit weight powders can be difficult to handle with conventional bulk handling systems. These products are typically shipped dry in bags via truck, rail box car or container, or in bulk rail cars or bulk highway trucks. The volume of the container, rail car or truck is often filled before the allowed weight is reached, which results in higher shipping costs.

Efforts have been made to improve the unit weight, to reduce dusting, and to improve flow characteristics, of fluffy powders by compaction, especially calcined kaolin, with varying degrees of success. Low unit weight, fluffy powders, however, generally cannot be compacted in traditional compacting equipment without additives due to difficulties in feeding the powder into the compaction zone of the equipment.

SUMMARY

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any particular disadvantage or solve all disadvantages noted in any part of this disclosure.

A process for compacting a powder is disclosed. An incoming powder is conveyed into a compaction zone between a top plate and a bottom plate by a conveyor belt which runs between the top and bottom plates. The incoming powder may be either non-compacted or only partially compacted. Pressure is applied to the powder by exerting force to at least one of the top plate or the bottom plate so that the top plate is moved toward the bottom plate, the bottom plate is moved toward the top plate, or both. This provides a compacted powder. Then, the top plate is moved away from the bottom plate, the bottom plate is moved away from the top plate, or both. The compacted powder is then conveyed out of the compaction zone to a discharge zone by the conveyor belt.

An apparatus for compacting a powder is also disclosed. The apparatus includes a feed section, a compaction section, a discharge section, and a conveyor belt extending through the feed, compaction, and discharge sections to convey powder through those sections. The feed section receives the powder onto the conveyor belt. The compaction section compresses the powder on the conveyor belt between two plates. The discharge section receives the compacted powder from the compaction section on the conveyor belt.

BRIEF DESCRIPTION OF THE DRAWINGS

FIG. 3 is a cross section through the feed section of the apparatus shown in FIG. 1 along lines B-B.

FIG. 4 is a cross section through the compacted product discharge section of the apparatus shown in FIG. 1 along lines C-C.

DETAILED DESCRIPTION

Figure 1:
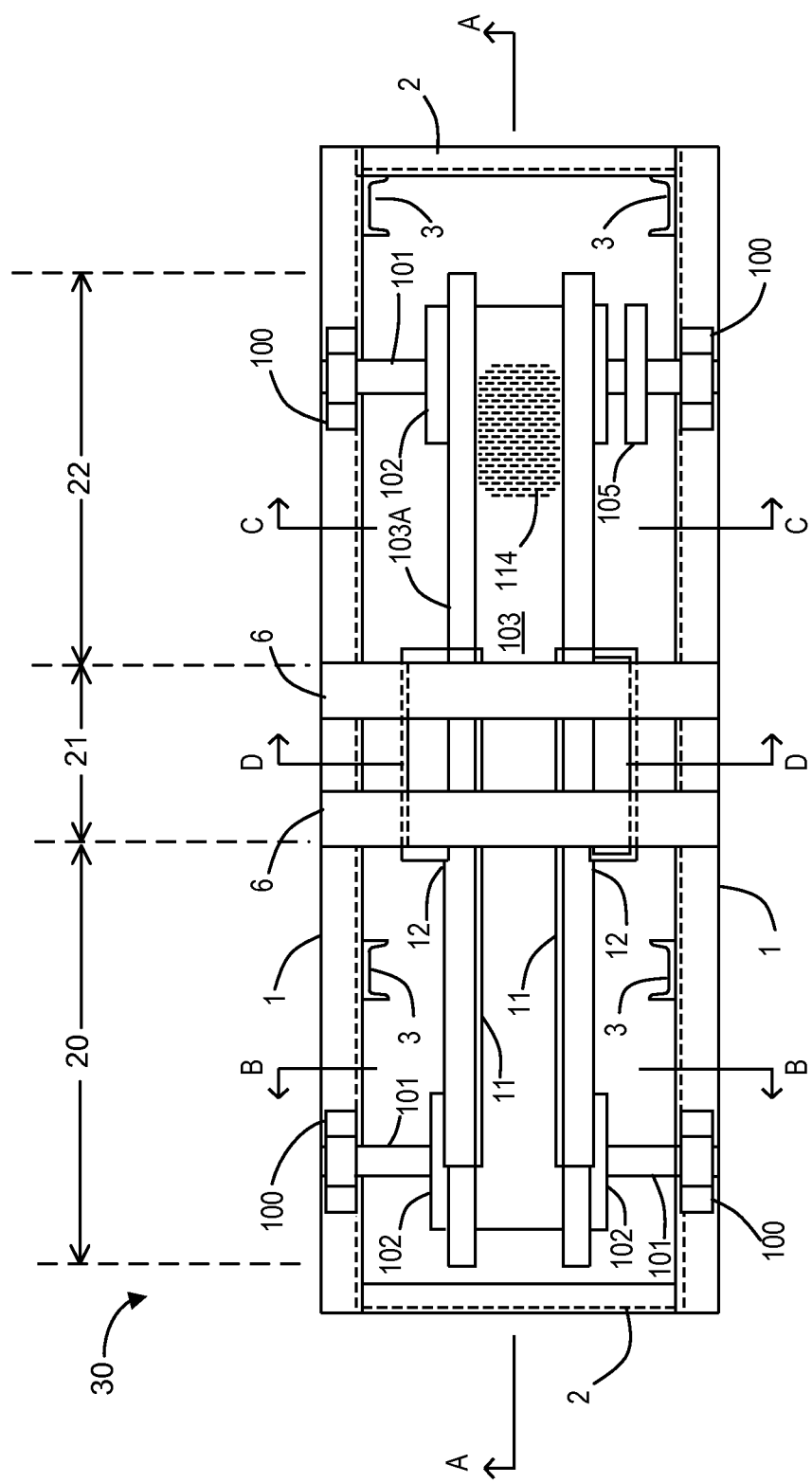
FIG. 1 is a plan view of an example of a compacting apparatus.

Refer now to the drawings, in which like numbers represent like elements throughout the several figures. FIG. 1 is a plan view of an example of a compacting apparatus 30 and shows an example of a feed section 20 for receiving a non-compacted powder, an example of a compaction section or zone 21 where the powder is compacted, and an example of a discharge section 22 where the compacted powder is discharged.

FIG. 1 also shows body frame components 1-3, upper support beams 6, side plates 11, beams 12 which hold side plates 11 in place, part of a drive mechanism (bearing 100, drive shaft 101, and tail pulley 102), a conveyor belt 103, and powder 114. The conveyor belt 103 extends through, and transports the powder through, the feed section 20, the compaction section or zone 21, and the discharge section 22. The conveyor belt 103 has sides 103A to prevent the powder from sliding off of the belt 103. The side plates 11 contain the non-compacted powder on the conveyor belt 103, especially during the compression process. FIG. 1 also shows bearings 100, shafts 101, driven sprocket 105, and head-end and tail-end pulleys 102.

Figure 2:
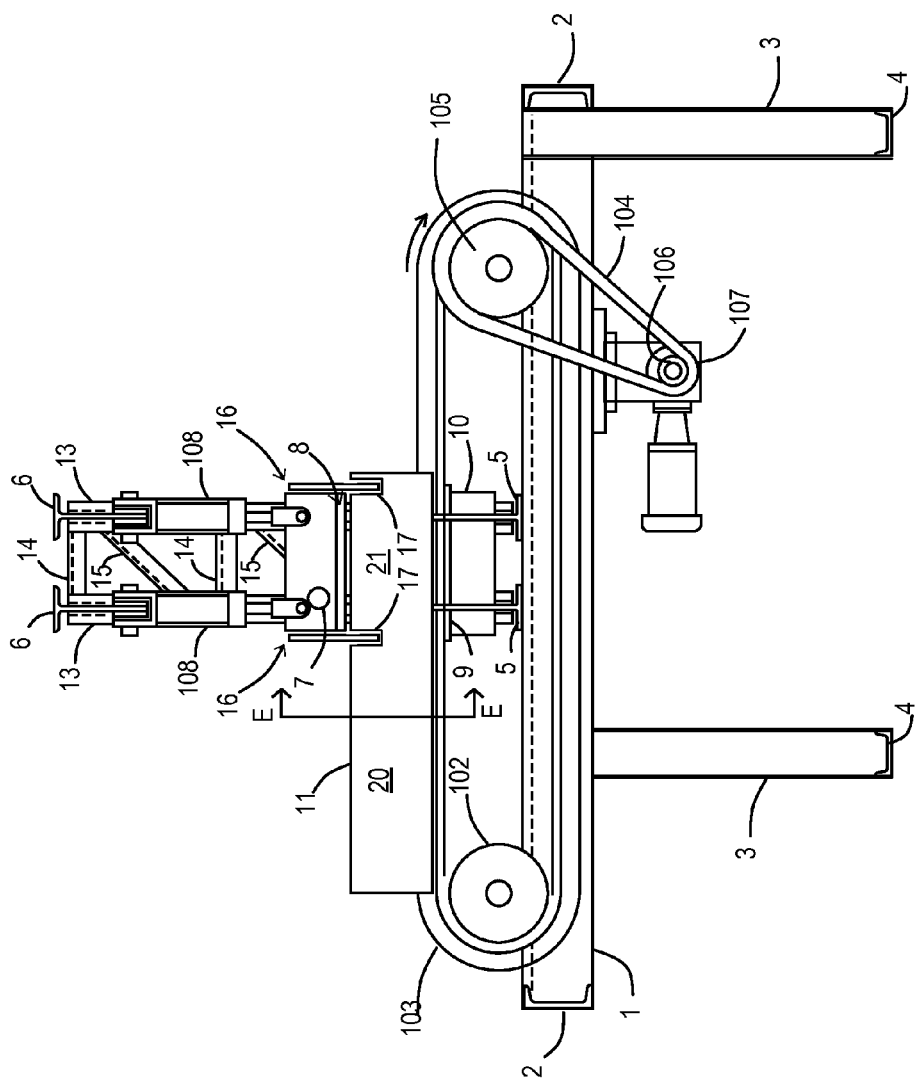
FIG. 2 is a horizontal section through the apparatus shown in FIG. 1 along lines A-A.

FIG. 2 is a horizontal section through the apparatus shown in FIG. 1 along lines A-A showing the body frame components 1-4, an end view of the lower beams 5, an end view of the upper support beams 6, a top (pressure) plate stem (handle) 7, a top (pressure) plate 8, a bottom plate 9, bottom plate support components 10, a side plate 11, vertical columns 13, bracing 14 and 15, an end plate 16, a tail-end pulley 102, the conveyor belt 103, more of the drive mechanism (motor drive assembly 107, a drive sprocket 106, a chain drive 104, and a driven sprocket 105), and hydraulic cylinders 108. The side plates 11 and end plates 16 may be considered to be border plates or confinement plates as they confine the powder 114 during compression.

Figure 6:
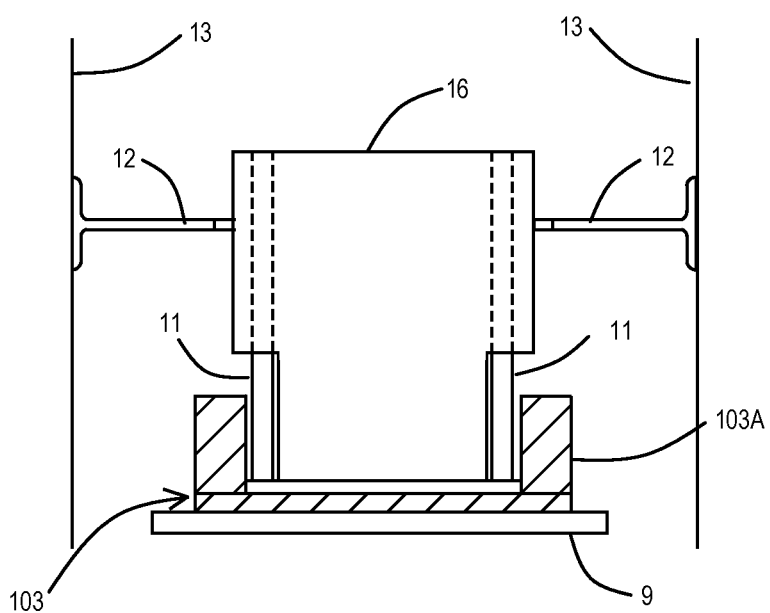
FIG. 6 is a cross section along lines E-E of FIG. 2 showing the end plate in a lowered position.

FIG. 6 is a cross section along lines E-E of FIG. 2 showing an end plate 16 in a lowered position. The end plates 16 may be T-shaped and the side plates 11 may have notches 17, as shown in FIG. 2, cut therein to accommodate the upper part of the "T" to stabilize and align the end plates 16 so that the end plates 16 will not be displaced when the powder is being compacted.

The bottom plate support components 10 support and give rigidity to the bottom plate 9. A bottom plate support component 10 may be, by way of example and not of limitation, a flat bar standing on its edge.

The bracing components 14 and 15 are bolted or affixed to the vertical columns 13 by any convenient and appropriate manner. As shown, bracing 14 is horizontal, while bracing 15 is diagonal. The bracing components 14 and 15 provide stability, prevent excessive flexing of the compaction section 21 when the top plate 8 is being pressed down, and helps to keep the compaction section 21 aligned parallel to the belt 103.

The stem 7 may be manufactured as a part of top plate 8, or may be a separate component, such as flat bar, which is later fastened to the top plate 8. The stem 7 runs parallel to the conveyor belt 103, and transmits the force from the hydraulic cylinders 108 to the top plate 8. Other techniques and designs may be used, if desired, to force the top plate 8 onto the belt 103 and bottom plate 9 to compact the powder.

Figure 5A:
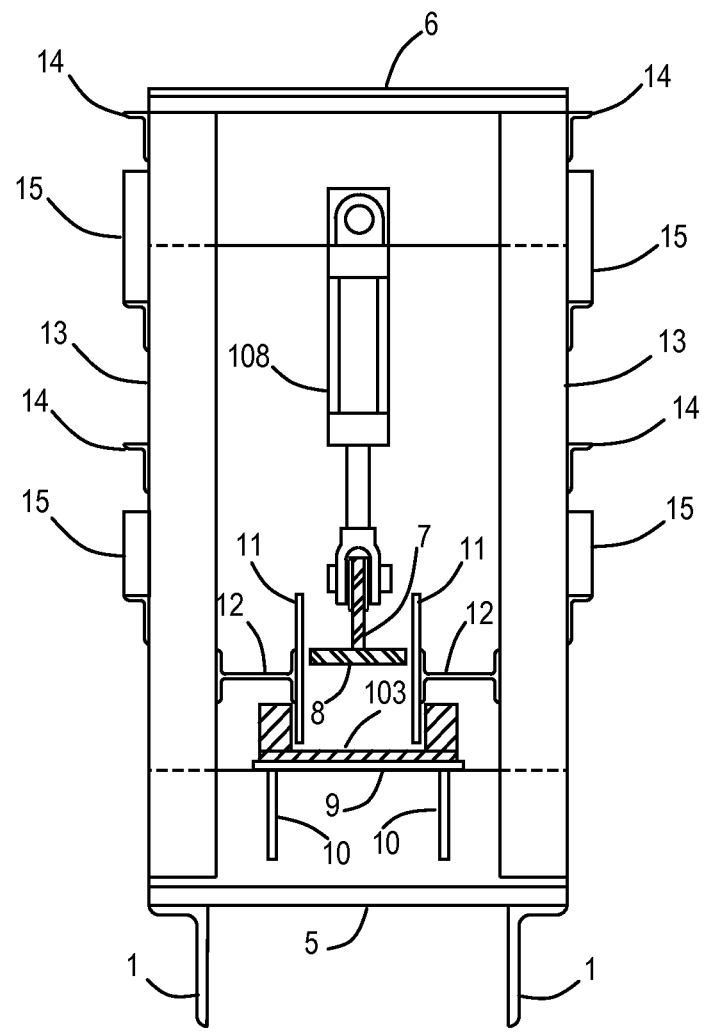
FIG. 5A is a cross section through the compaction section in one embodiment of the apparatus shown in FIG. 1 along lines D-D.
Figure 5B:
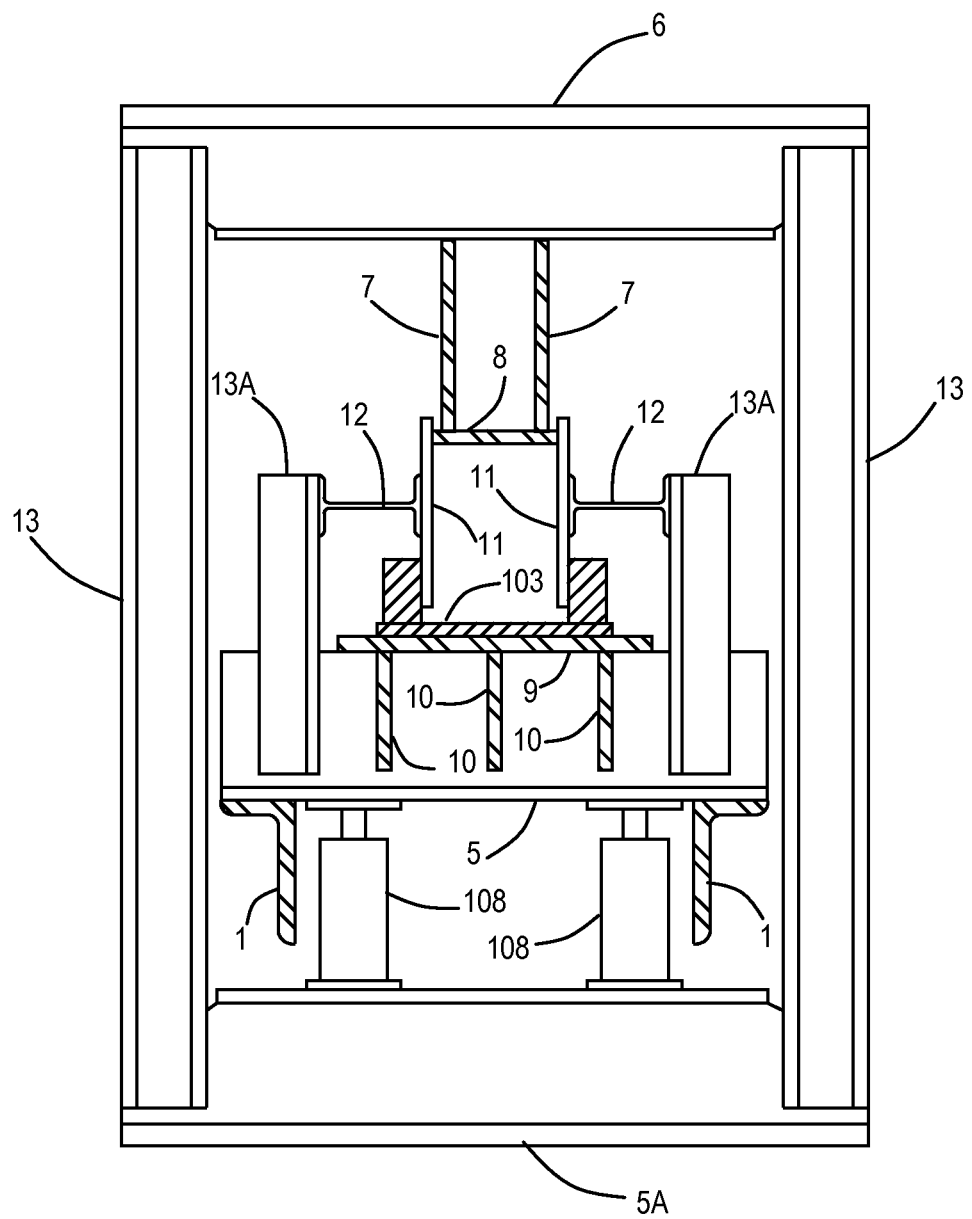
FIG. 5B is a cross section through the compaction section in another embodiment of the apparatus shown in FIG. 1 along lines D-D.

Referring to FIGS. 5A and 5B and the end plate detail view shown in FIG. 6, the side plates 11 are inside the side walls 103A. This prevents the force of compression from being transferred against the belt side walls 103A. The side plates 11 are held in place inside of the belt side walls 103A, and above the conveyor belt 103, by being fastened to beams 12, which are fastened to the vertical columns 13 in FIG. 5A or to the vertical columns 13A in FIG. 5B. For convenience, beams 12 are I-beams which have been trimmed back to a "T"-configuration.

FIG. 3 is a cross section through the feed section 20 of the apparatus shown in FIG. 1 along lines B-B showing body frame component 1, side plates 11, beams 12, bearing 100, idle (non-driven) shaft 101, and a tail-end pulley 102 for the conveyor belt 103.

FIG. 4 is a cross section through the compacted product discharge section of the apparatus shown in FIG. 1 along lines C-C showing another bearing 100, the head-end pulley 102, and more of the drive mechanism (chain drive 104, driven sprocket 105, drive sprocket 106, and the motor drive assembly 107).

FIG. 5A is a cross section through the compaction section 21 in one embodiment of the apparatus shown in FIG. 1 along lines D-D showing the body frame component 1, a side view of one of the lower support beams 5, a side view of one of the upper support beams 6, one of the cylinders 108, the top plate stem 7, the top plate 8, the bottom plate 9, the bottom plate support components 10, the side plates 11, beams 12, some of the vertical columns 13, bracing components 14 and 15, and the conveyor belt 103. In this embodiment, the bottom plate 9 is stationary and the top plate 8 is moveable. As mentioned, the side plates 11 confine the powder on the conveyor belt 103.

The bottom plate 9 supports the conveyor belt 103, especially during compaction. The plate 9 is supported by components 10, which are fastened to the lower support beams 5. The beams 5 are fastened to the lower ends of the vertical columns 13, and the upper ends of the vertical columns 13 are fastened to the upper support beams 6. Each hydraulic cylinder 108 is connected on one end to the stem 7 and on the other end to an upper support beam 6. The top plate 8 is lowered (pressed down) onto the non-compacted powder by extending the hydraulic cylinders 108 until the desired pressure on the powder is reached.

Lower support beams 5, vertical columns 13, upper support beams 6, and bracing components 14 and 15 serve to provide a rigid frame for the compaction section 21. It will be appreciated that a substantial separation force (tension) will be present when the hydraulic cylinders 108 are pressurized (extended) to force top plate 8 down on the conveyor belt 103 to compact the powder and this rigid frame is designed to accommodate such forces. The design of the frame for the compaction section 21 will vary depending upon machine size and operating pressures, but should be sufficiently rigid and robust to withstand the forces present.

The depth of the lower support beams 5 is selected so that, in combination with the bottom plate support components 10, the bottom plate 9 will be at the proper height to achieve the desired compaction pressure when the hydraulic cylinders 108 are extended. As shown in FIG. 5A, the lower support beams 5 are preferably notched to accept the bottom plate support components 10. Also as shown in FIG. 5, the components 10 support the bottom plate 9 in the direction parallel to the conveyor belt 103, and the beams 5 support the plate 9 in a perpendicular direction.

The sequence of operation is to activate the motor drive assembly 107 to move the conveyor belt 103 while incoming non-compacted powder or partially-compacted powder is being fed onto the conveyor belt 103 in the feed section 20. For convenience of discussion below, the term "non-compacted powder" includes partially-compacted powder, unless specifically stated to be otherwise or unless the context requires otherwise. The conveyor belt 103 conveys the non-compacted powder into the compaction zone 21. The motor drive assembly 107, conveyor belt 103 and the feed to the conveyor belt 103 are then stopped, preferably but not necessarily simultaneously. The conveyor belt 103 is stopped when the incoming non-compacted powder on the conveyor belt 103 covers all of, substantially all of, or at least a desired portion of, the bottom plate 9. This may be done by any convenient method such as, but not limited to, a belt position sensor which determines when the belt 103 has been advanced by a predetermined amount, or an electric eye to detect a predetermined height of non-compacted powder on the conveyor belt 103.

The end plates 16 are then lowered into position onto the conveyor belt 103 and the hydraulic cylinders 108 that are attached to the top plate 8 are pressurized by a hydraulic pump (not shown) to lower the top plate 8 and press it down on the powder until sufficient pressure is applied to the powder to produce the desired compacted product. The end plates 16 may be moved (lowered, raised) by hydraulic cylinders, electric screws, or other devices (18A, 18B of FIG. 7).

The pressure to be applied will depend upon the powder and the desired compacted product. Typical pressures used in experiments on calcined kaolin and air floated kaolin have been from 100 pounds per square inch to 350 pounds per square inch. Higher or lower pressures can be used to obtain a desired final product. The pressure is preferably maintained only for a short time, such as a few seconds. Longer times are acceptable, but can adversely affect the flow-through rate. Shorter times may be acceptable, depending upon the particular characteristics of the powder being compacted. The non-compacted powder is thereby converted to a compacted powder.

The side plates 11 and the end plates 16 serve to confine the powder and keep it from being spread when it is being compacted. The top plate 8 may be perforated to allow air under the top plate 8 to escape so as to reduce or minimize powder being blown off of the belt 103 when the top plate 8 is lowered. The side plates 11 and/or the end plates 16 are important, and are preferred, but are not critical. If one or both of them is not used then the compaction process will still be performed, but some of the powder may be blown or pressed off of the conveyor belt 103, and/or some of the powder along the edges of the conveyor belt 103 may not be completely compacted.

The top plate 8 and end plates 16 are then raised. The conveyor belt 103 is re-started when, or shortly after, the plates 8 and 16 are raised. Preferably, but not necessarily, the feed is restarted when conveyor belt 103 is restarted so that any gaps between the compacted powder and the non-compacted powder are minimized. This maximizes the flow-through rate.

The conveyor belt 103 then transports the compacted powder from the compacting zone 21 to the discharge end 22 of the compactor where the compacted powder can be transported to, or provided to, a desired container or process. The compaction and discharge and feed steps are then repeated as desired.

FIG. 5B is a cross section through the compaction section in another embodiment of the apparatus shown in FIG. 1 along lines D-D. The top plate 8 is fixed, and the bottom plate 9, along with the belt 103 and the powder thereon, are raised. The top plate 8 is fixed to beam 6 by stems 7 (flat bars in this case). The bottom plate 9 and conveyor belt 103 are supported by beam 5. Beam 5 is raised by extending hydraulic cylinders 108 which are supported by beam 5A. Beams 5A and 6 are connected by columns 13 which resist the compressive force created by extending the hydraulic cylinders 108. The end plates 16 are initially in a raised position, are lowered down onto the belt 103, and are then either raised or allowed to be pushed upward as the bottom plate 9 is raised. After compaction, the bottom plate 9 is lowered and the end plates remain in the raised position.

In one embodiment the bottom plate 9, belt 103, the bottom plate support components 10, the side plates 11, the beams 12, columns 13A, frame components 1 and 2, lower support beams 5, drive sprockets 105 and 106, and the various components of the motor drive assembly 107 may be moved upward as a unit. In another embodiment, the various components of the motor drive assembly 107 may be stationary even while the other components are being raised and/or lowered. In this embodiment, one or more idler wheels or pulleys (not shown) may be used to take up any slack in the belt 103 that may otherwise be present when the belt 103 is in the raised position, the lowered position, or transitioning between positions, In another alternative embodiment, neither the top plate 8 nor the bottom plate 9 are fixed. In this alternative embodiment, to provide compaction, the top plate 8 is lowered and the bottom plate 9, along with the belt 103 and the powder thereon, are raised. After compaction, the bottom plate 9 is then lowered, the top plate 8 is raised, and the end plates 16 are raised. The end plates 16 are again moveable and may be lowered prior to beginning compaction and raised after compaction.

The end plates 16 may, if desired, be positioned to level the incoming powder to a desired depth before compaction. Alternatively, a fixed or adjustable bar, vibrator, and/or other mechanism may be used to level the incoming powder to the desired depth before compaction.

Figure 7:
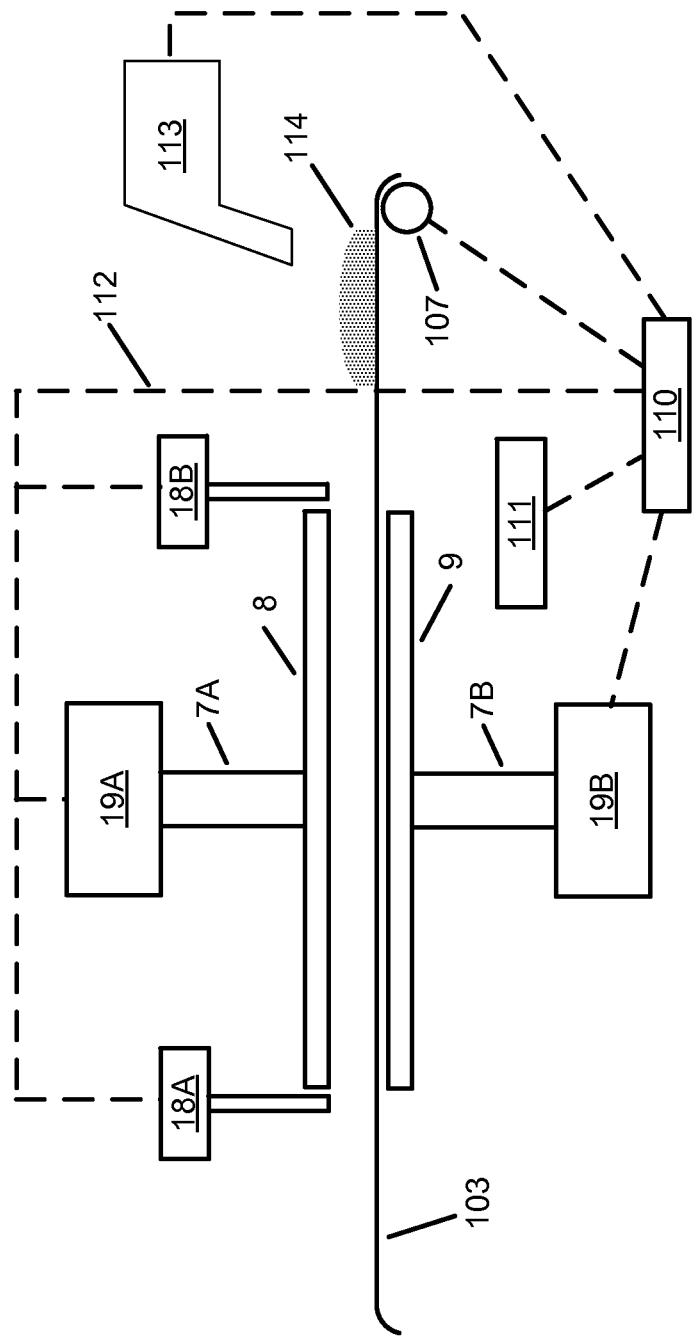
FIG. 7 is a schematic diagram showing computer-controlled operation of the apparatus of FIG. 1.

FIG. 7 is a schematic diagram showing computer-controlled operation of the apparatus of FIG. 1. A computer 110, application specified integrated circuit (ASIC) or other processor-based device preferably controls the operation of the machine 30. The computer 110 reads the data from one or more sensors 111 and controls the operation of the various components, such as, but not limited to, a motor 109 to drive the motor drive assembly 107, drives 18A and 18B for the end plates 16, hydraulic cylinders 108A and 108B or other devices or drives which move the plates 8 and 9, and a powder feed mechanism 113. Exemplary powder 114 is also shown. The motor 109 and drives 7A, 7B, 18A, and 18B, may be, by way of example and not of limitation, electric motors, pneumatically-driven motors, hydraulic cylinders, etc. The computer 110 is connected to the various drives, motor, mechanism, and sensors by a plurality of signal or control lines 112.

Figure 8:
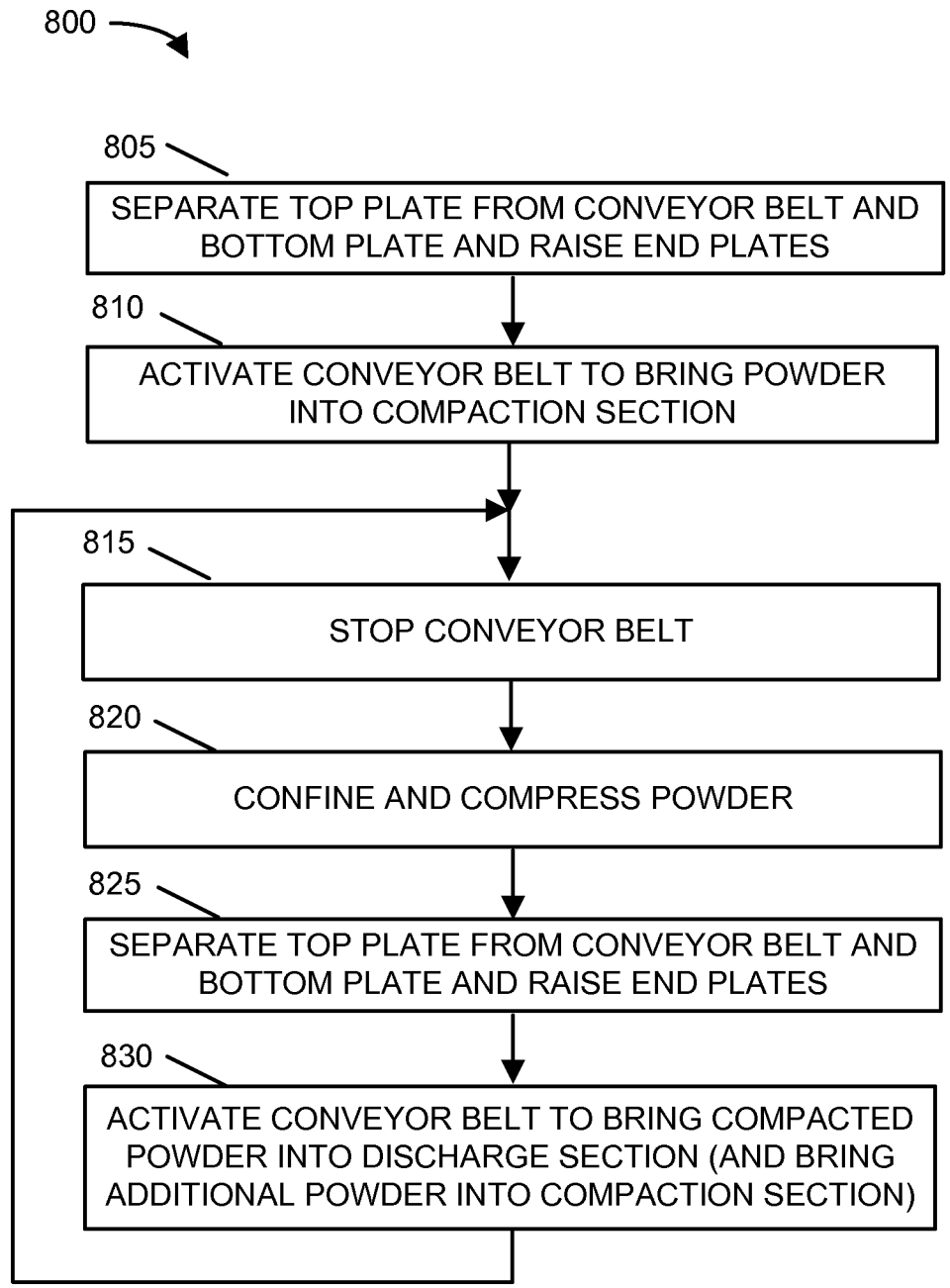
FIG. 8 is a flow chart showing the exemplary operation of the apparatus of FIG. 1.

FIG. 8 is a flow chart showing the exemplary operation 800 of the apparatus of FIG. 1. As discussed above, the process is preferably performed under computer control. The operation is the same in all of the above embodiments: while the end plates 16 are in the raised position, powder 114 is conveyed by belt 103 into the compaction zone 21, the end plates 16 are lowered, the top plate 8 is lowered and/or the bottom plate 9 is raised to compact the powder 114, the end plates 16 are raised, the top plate 8 and/or the bottom plate 9 are returned to their previous positions, and the compacted powder 114 is conveyed by the belt 103 out of the compaction zone 21 into the discharge section 22 while non-compacted powder 114 is being brought from the feed section 20 into the compaction zone 21. At operation 805 the top plate 8 is separated from the conveyor belt 103 and the bottom plate 9 if they are not already in that separated position. They may already be in that separated position as a result of previous operation of the apparatus.

As discussed above, separation can be done by moving the top plate 8 upward and/or moving the conveyor belt 103 and bottom plate 9 downward. At operation 810 the conveyor belt 103 is activated to bring non-compacted powder into the compaction section 21. At operation 815 the conveyor belt is stopped. At operation 820 the non-compacted powder is confined and compressed. Confinement may be achieved by, for example, moving the end plates 16 to the conveyor belt 103, vice versa, or both. Compression may be achieved by, for example, moving the top plate 8 toward the conveyor belt 103 and bottom plate 9, moving the bottom plate 9 and the conveyor belt 103 toward the top plate 8, or both. At operation 825 the top plate 8 is separated from the conveyor belt 103 and the bottom plate 9. At operation 830 the conveyor belt 103 is activated to bring compacted powder out of the compaction section 21 and into the discharge section 22 and, if more powder is to be compacted, additional powder is placed onto the conveyor belt 103, which brings that additional powder into the compaction section 21. A return is then made and operations 815-830 are repeated as many times as desired.

If there is no more powder to be compacted at that time, then the conveyor belt 103 may be stopped. The top plate, conveyor belt, and bottom plate may, if desired, be left in the separated position for the next operation of the apparatus.

The discharged compacted powder has an increased unit weight compared to the non-compacted powder which entered into the compactor. Results of tests for the compaction of calcined kaolin show a substantial increase in unit weight, from about 12 pounds per cubic foot for the non-compacted powder to about 25 to 30 pounds per cubic foot for the compacted powder. The flow characteristics of the compacted powder are also better than those of non-compacted powder so containers, including rail and highway equipment and bags, can be filled at a higher rate, which provides for quicker and more efficient packaging operations. Other properties and performance of the compacted product are either equivalent to, or improved over, corresponding properties and performance of the non-compacted powder. For example, other properties, including but not limited to rheological and optical properties, of compacted calcined kaolin product either are improved or are equivalent to the corresponding properties of the non-compacted product.

The compacted powder can be directly loaded into conventional shipping equipment with improved weight loading, or packaged in smaller packages, which provides for improved weight loading in trucks, containers or rail freight cars. The compacted powder provides for an increased weight per container when loaded in conventional equipment, i.e., there are more tons of product per rail freight car or highway truck. Conventional rail and highway equipment used for shipping non-compacted powder materials can still be used for shipping the compacted powder as long as the rated or allowable weight limit of the equipment is not exceeded. The compacted powder can also be packaged in smaller bags for a given weight, or more weight of the powder can be packaged in a given bag size.

A powder is compacted as described herein to a unit weight which is increased from the initial unit weight of the non-compacted powder. For example, non-compacted calcined kaolin having an initial unit weight of about 10 to 15 pounds per cubic foot can be compacted to a compacted product with a unit weight of about 20 to 35 pounds per cubic foot. Additionally, a non-compacted air floated kaolin having a unit weight of 18 to 30 pounds per cubic foot can be compacted to about 30 to 50 pounds per cubic foot. The experiments conducted to ascertain the desired pressure have been mostly conducted on calcined kaolin. The process and apparatus described herein are also applicable to other powders, but different pressures may be appropriate and may be determined by experimentation.

Although the feed powder has been described above as being a non-compacted powder, the process and apparatus described above may also be used with powders which have been partially compacted, such as by another process or by environmental conditions, to produce a more-compacted powder.

The parts list, dimensions and other specifications provided herein are for a prototype which was used to test the concept and should not be considered to be limiting or mandatory in any manner. The actual dimensions and other specifications will depend upon, for example but not limited to, the desired flow-through rate, the powder being compacted, the degree of compaction desired, etc.

The side plates 11, the end plates 16, and the belt side walls 103A not necessary, but are optional, and are preferred, as they allow for a deeper bed of non-compacted powder to be contained for compacting. Thus, one could use none, one, two, or all of these components, as desired.

The top plate 8 may be a perforated plate; bars/beams aligned with spaces between or any other arrangement to allow the air in the powder to easily escape when pressure is applied. Woven fabric, wire mesh, a perforated belt or other items may be used between top plate 8 and the powder to reduce the volume of powder that escapes during compaction.

The forces down on top plate 8 are generated by hydraulic cylinders 108 in this model. However, other choices, for example, could be hydraulic bladders, electric screws, mechanical cams or any other system or combination of systems to produce the force needed for generating the desired pressure on the powder being processed.

Optionally, a sweeper, blower, or other mechanism (not shown) may be used to remove any powder that may collect on the top plate 8. This powder is preferably returned to the feed input stream for compaction, but may also be placed in the output stream, even though non-compacted or only partially compacted.

It should be appreciated that the logical operations described herein may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein. It should also be appreciated that the logical operations described herein may be implemented using electronic circuits, switches, and relays, although that it not a preferred implementation.

Figure 9:
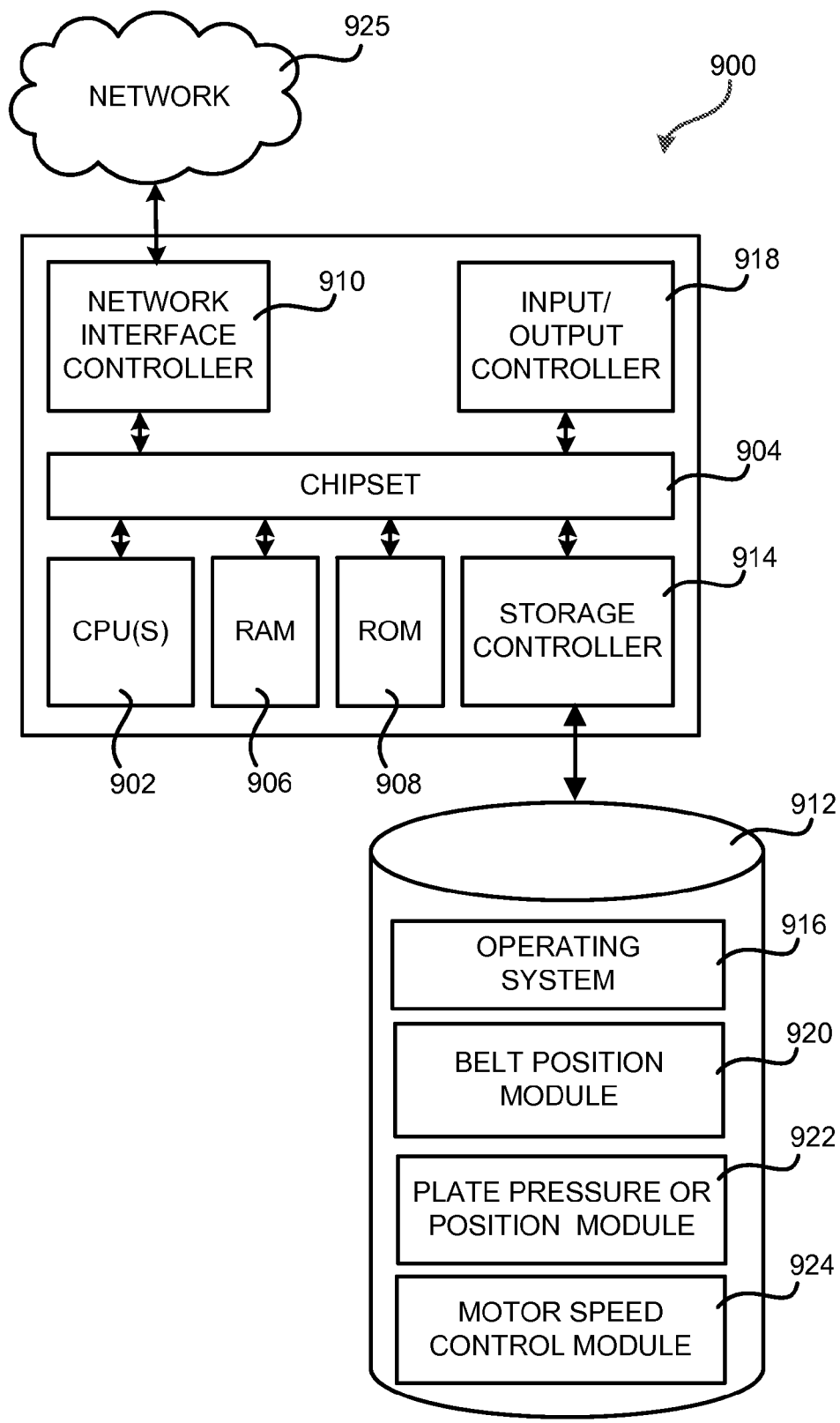
FIG. 9 is a computer architecture diagram showing an exemplary computer architecture for a device capable of performing the functionality disclosed herein for compressing a powder.

FIG. 9 is a computer architecture diagram showing an exemplary computer architecture for a client access server or other computing device 900 capable of performing the functionality disclosed herein for compacting a powder. The computer architecture shown illustrates a conventional server computer, workstation, desktop computer, laptop, network appliance, or other computing device, and may be utilized to execute any aspects of the software components presented herein described as executing within the computing device and/or other computing devices mentioned herein.

The computer 900 includes a baseboard, or "motherboard," which is a printed circuit board to which a multitude of components or devices may be connected by way of a system bus or other electrical communication paths. In one illustrative configuration, one or more central processing units ("CPUs") 902 operate in conjunction with a chipset 904. The CPUs 902 are standard programmable processors that perform arithmetic and logical operations necessary for the operation of the computer 900.

The CPUs 902 perform the necessary operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 904 provides an interface between the CPUs 902 and the remainder of the components and devices on the baseboard. The chipset 904 may provide an interface to a random access memory ("RAM") 906, used as the main memory in the computer 900. The chipset 904 may further provide an interface to a computer-readable storage medium such as a read-only memory ("ROM") 908 or non-volatile RAM ("NVRAM") for storing basic routines that help or serve to start up the computer 900 and to transfer information between the various components and devices. The ROM 908 or NVRAM may also store other software components necessary for the operation of the computer 900 in accordance with the configurations described herein.

The computer 900 may operate in a networked environment using logical connections to remote computing devices and computer systems through a network 925. The chipset 904 may include functionality for providing network connectivity through a network interface controller ("NIC") 910, such as a gigabit Ethernet adapter. The NIC 910 is capable of connecting the computer 900 to other computing devices over the network. It should be appreciated that multiple NICs 910 may be present in the computer 900, connecting the computer to multiple communication channels, such as but not limited to communication channels in the network, other types of networks, and remote computer systems. For example, the computer 900 may be linked to other computers or systems which monitor the level of incoming powder in a bin or hopper, and the computer 900 may automatically stop operation if the supply of incoming powder is depleted or drops below a certain level. As another example, the computer 900 may be linked to other computers or systems which perform bagging and/or loading operations, and the computer 900 may automatically stop operation if the bagging operation is stopped, such as due to running out of bags, or a jam in the bagging mechanism, or if the loading operation is stopped, such as while waiting for another vehicle to be moved to the loading area or dock.

The computer 900 may be connected to a mass storage device 912 that provides non-volatile storage for the computer. The mass storage device 912 may store system programs, application programs, other program modules and data, which have been described in greater detail herein. The mass storage device 912 may be connected to the computer 900 through a storage controller 914 connected to the chipset 904. The mass storage device 912 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 912 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 912 is characterized as primary or secondary storage and the like.

For example, the computer 900 may store information to the mass storage device 912 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 912 by detecting the physical states or characteristics of one or more particular locations within the physical storage units.

In addition to the mass storage device 912 described above, the computer 900 may have access to other computer-readable storage medium to store and retrieve information, such as program modules, data structures, or other data. It should be appreciated by those skilled in the art that computer-readable storage media can be any available media that provides for the storage of data and that may be accessed by the computer 900.

Notwithstanding anything to the contrary herein, the terms computer-readable storage medium and computer-readable storage media, as used herein, comprise only statutory subject matter within the meaning of 35 U.S.C. §101 as interpreted or defined by a court of competent jurisdiction. These terms do not, however, encompass propagated signals per se nor any other interpretation which renders a claim invalid under 35 U.S.C. §101.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 912 may store an operating system 916 utilized to control the operation of the computer 900. According to one configuration, the operating system includes a member of the LINUX family of operating systems. According to another configuration, the operating system includes a member of the WINDOWS® SERVER family of operating systems from MICROSOFT Corporation in Redmond, Wash. According to further configurations, the operating system may include a member of the UNIX family of operating systems. It should be appreciated that other operating systems may also be utilized.

The mass storage device 912 may store other system or application programs, modules, and/or data utilized by the computer 900 such as a belt position module 920, a plate pressure or position module 922, a motor speed control module 924, etc. These various modules contain instructions for obtaining data regarding the operation (position, speed, etc.) of the component to controlled, and for providing output instructions to implement or adjust the operation of that or another component.

In one configuration, the mass storage device 912 or other computer-readable storage media is encoded with computer-executable instructions that, when loaded into the computer 900, transform the computer from a general-purpose computing system into a special-purpose computer capable of implementing the configurations described herein. These computer-executable instructions transform the computer 900 by specifying how the CPUs 902 transition between states, as described above. According to one configuration, the computer 900 has access to computer-readable storage media storing computer-executable instructions which, when executed by the computer 900, perform aspects of one or more of the methods or procedures described herein.

The computer 900 may also include an input/output controller 918 for receiving and processing input from a number of input devices, such as a keyboard, a mouse, a touchpad, a touch screen, an electronic stylus, or other type of input device. Similarly, the input/output controller 918 may provide output to a display, such as a computer monitor, a flat-panel display, a digital projector, a printer, a plotter, or other type of output device. It will be appreciated that the computer 900 may not include all of the components shown herein, may include other components that are not explicitly shown herein, or may utilize an architecture completely different than that shown herein.

A process and a device have been described for compacting powders to increase the bulk density of the powder to provide an increased unit weight. The compacted product provides for increased weight loading of conventional shipping containers, and containers of a given size, without additives. Additives may still be used if desired, however, and may improve performance with respect to some powders. Exemplary embodiments have been disclosed herein and in the accompanying drawing, but variations and modifications can be made without departing from the true spirit and scope of the invention, which is set forth in the following claims. The subject matter described above is therefore provided by way of illustration only and should not be construed as limiting.

Although the subject matter presented herein has been described in language specific to computer structural features, methodological acts, transformative acts, specific computing machinery, and computer readable media, it is to be understood that the appended claims are not necessarily limited to the specific features, acts, or media described herein. Rather, the specific features, acts and mediums are disclosed as example forms of implementing the claims.

The different advantages and benefits provided by the present invention may be obtained and used individually, or may be obtained and used in combination with one, some or even all of the other benefits. Furthermore, not every implementation, nor every component of any implementation, is necessarily required to obtain one or more of the advantages and benefits described herein.

Conditional language, such as, among others, "can", "could", "might", or "may", unless specifically stated otherwise, or otherwise understood within the context as used, is generally intended to convey that certain embodiments optionally could include certain features, elements and/or steps, while some other embodiments do not include those certain features, elements and/or steps. Thus, such conditional language indicates, in general, that those features, elements and/or step are not required for every implementation or embodiment.

What is claimed is:

1. An apparatus to compact an incoming powder, the incoming powder having a bulk density and being either non-compacted or partially compacted, the apparatus comprising:
 a conveyor belt;
 a feed section to receive the incoming powder onto the conveyor belt;
 a compaction section to compress the incoming powder on the conveyor belt between two plates to provide a compacted powder having an increased bulk density with respect to the bulk density of the incoming powder;
 a discharge section to receive the compacted powder from the compaction section on the conveyor belt;
 wherein the conveyor belt extends through the feed, compaction, and discharge sections; and
 a motor, controllable to cause the conveyor belt to move the incoming powder from the feed section into the compaction section, to cause the conveyor belt to be stopped during compaction, and to cause the conveyor belt to move the compacted powder out of the compaction section and into the discharge section.

2. The apparatus of claim 1 wherein the two plates comprise a top plate and a bottom plate, the conveyor belt being interposed between the top plate and the bottom plate, the bottom plate being fixed, and the top plate is pressed downward toward the bottom plate to compact the incoming powder.

3. The apparatus of claim 1 wherein the two plates comprise a top plate and a bottom plate, the conveyor belt being interposed between the top plate and the bottom plate, the top plate being fixed, and the bottom plate and the conveyor belt are pressed upward toward the top plate to compact the incoming powder.

4. The apparatus of claim 1 wherein the two plates comprise a top plate and a bottom plate, the conveyor belt being interposed between the top plate and the bottom plate, and, to compact the incoming powder, the top plate is pressed downward toward the bottom plate, and the bottom plate and the conveyor belt are pressed upward toward the top plate.

5. The apparatus of claim 1 and further comprising side plates on both sides of the conveyor belt in the compaction section to retain the incoming powder on the conveyor belt during compaction.

6. The apparatus of claim 1 and further comprising moveable end plates on both ends of the top plate to retain the incoming powder on the conveyor belt during compaction.

7. The apparatus of claim 1 and further comprising moveable end plates on both ends of the top plate, and at least one of (i) the end plates are pressed toward the conveyor belt no later than when the compaction section compresses the incoming powder, or (ii) the conveyor belt is pressed toward the end plates no later than when the compaction section compresses the incoming powder.

8. The apparatus of claim 1 and further comprising:
 side plates on either side of the conveyor belt in the compaction section to retain the incoming powder on the conveyor belt during compaction;
 end plates on both ends of the top plate; and
 wherein the end plates are pressed toward the conveyor belt no later than when the compaction section begins compressing the incoming powder.

9. The apparatus of claim 1 and further comprising a motor, controllable to cause the conveyor belt to move the incoming powder into the compaction section, to cause the conveyor belt to be stopped during compaction, and to cause the conveyor belt to move the compacted powder out of the compaction section and into the discharge section.

10. The apparatus of claim 1 wherein the compacted powder has a unit weight which is in the range of 167% to 277% greater than a unit weight of the incoming powder.

11. The apparatus of claim 1 wherein the desired pressure is in the range of 100 to 350 pounds per square inch.

12. The apparatus of claim 1 wherein the performance and properties of the compacted powder are not negatively affected with respect to the performance and properties of the incoming powder.

13. The apparatus of claim 1 wherein the handling characteristics of the compacted powder are improved with respect to the handling characteristics of the incoming powder.

14. The apparatus of claim 1 wherein the performance and properties of the compacted powder are positively affected with respect to the performance and properties of the incoming powder.

15. The apparatus of claim 1 wherein the feed section receives the incoming powder onto the conveyor belt while the discharge section receives the compacted powder from the compaction section on the conveyor belt.

16. An apparatus to compact an incoming powder, the incoming powder having a bulk density and being either non-compacted or partially compacted, the apparatus comprising:
- a conveyor belt;
- a feed section to receive the incoming powder onto the conveyor belt;
- a compaction section to compress the incoming powder on the conveyor belt between a top plate and a bottom plate to provide a compacted powder having an increased bulk density with respect to the bulk density of the incoming powder, the compaction section further comprising side plates on both sides of the conveyor belt to retain the incoming powder on the conveyor belt during compaction, the compaction section further comprising end plates on both ends of the top plate to retain the incoming powder on the conveyor belt during compaction;
- a discharge section to receive the compacted powder from the compaction section on the conveyor belt;
- wherein the conveyor belt extends through the feed, compaction, and discharge sections, and is interposed between the top plate and the bottom plate of the compaction section; and
- a motor, controllable to cause the conveyor belt to move the incoming powder from the feed section into the compaction section, to cause the conveyor belt to be stopped during compaction, and to cause the conveyor belt to move the compacted powder out of the compaction section and into the discharge section.

17. The apparatus of claim 16 wherein (i) the top plate is pressed downward toward the bottom plate, (ii) the bottom plate and the conveyor belt are pressed upward toward the top plate, or (iii) the top plate is pressed downward toward the bottom plate while the bottom plate and the conveyor belt are pressed upward toward the top plate.

18. The apparatus of claim 16 wherein (i) the end plates are pressed toward the conveyor belt no later than when the compaction section compresses the incoming powder, (ii) the conveyor belt is pressed toward the end plates no later than when the compaction section compresses the incoming powder, or (iii) the end plates are pressed toward the conveyor belt and the conveyor belt is pressed toward the end plates no later than when the compaction section compresses the incoming powder.

19. The apparatus of claim 16 wherein the compacted powder has a unit weight which is in the range of 167% to 277% greater than a unit weight of the incoming powder.

20. The apparatus of claim 16 wherein the desired pressure is in the range of 100 to 350 pounds per square inch.

* * * * *